US012681983B2

(12) United States Patent
Chen et al.

(10) Patent No.: US 12,681,983 B2
(45) Date of Patent: Jul. 14, 2026

(54) FILE VIEWING METHOD AND FILE VIEWING SYSTEM

(71) Applicant: ASUSTEK COMPUTER INC., Taipei (TW)

(72) Inventors: Shu-Yun Chen, Taipei (TW); Chuen-An Shih, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 18/534,185

(22) Filed: Dec. 8, 2023

(65) Prior Publication Data

US 2025/0103643 A1 Mar. 27, 2025

(30) Foreign Application Priority Data

Sep. 27, 2023 (TW) ................................. 112137188

(51) Int. Cl.
*G06F 16/54* (2019.01)
*G06F 16/538* (2019.01)
*G06F 16/583* (2019.01)

(52) U.S. Cl.
CPC ............ *G06F 16/54* (2019.01); *G06F 16/538* (2019.01); *G06F 16/5846* (2019.01)

(58) Field of Classification Search
CPC ..... G06F 16/54; G06F 16/538; G06F 16/5846
See application file for complete search history.

(56) References Cited

U.S. PATENT DOCUMENTS

| | | | | |
|---|---|---|---|---|
| 2004/0127254 A1* | 7/2004 | Chang | ...................... | G06F 8/61 |
| | | | | 455/557 |
| 2008/0278582 A1* | 11/2008 | Chung | ..................... | H04N 7/18 |
| | | | | 348/E7.085 |
| 2015/0095855 A1* | 4/2015 | Bai | ..................... | G06F 16/5846 |
| | | | | 715/863 |
| 2017/0345162 A1* | 11/2017 | Bamba | ..................... | G06T 7/248 |
| 2018/0329927 A1* | 11/2018 | Garg | ......................... | G06T 3/04 |

(Continued)

FOREIGN PATENT DOCUMENTS

| | | | | |
|---|---|---|---|---|
| CN | 102541424 A | 7/2012 | | |
| CN | 104463974 A | 3/2015 | | |
| CN | 115297291 A | * 11/2022 | ........... | H04N 7/0127 |

*Primary Examiner* — Ann J Lo
*Assistant Examiner* — Fernando M Mari Valcarcel
(74) *Attorney, Agent, or Firm* — MUNCY, GEISSLER, OLDS & LOWE, P.C.

(57) ABSTRACT

A file viewing method applies to a file viewing system including a first client electronic device and a second client electronic device. The second client electronic device includes a target object and an application program adapted to view the target object. The file viewing method includes receiving, by the second client electronic device, an instruction generated by the first client electronic device after determining that the second client electronic device has established a connection to the first client electronic device; executing, by the second client electronic device according to the instruction, the application program to open the target object, to further generate an operable model; and transmitting, by the second client electronic device, a model image corresponding to the operable model to the first client electronic device at an adjustable frame rate, and displaying the model image on a user interface of the first client electronic device.

10 Claims, 10 Drawing Sheets

(56) References Cited

U.S. PATENT DOCUMENTS

| | | | |
|---|---|---|---|
| 2019/0324450 A1* | 10/2019 | Lurie | H04L 12/40026 |
| 2020/0126309 A1* | 4/2020 | Moroze | G06T 19/003 |
| 2020/0401212 A1* | 12/2020 | Devries | G02B 27/0101 |
| 2021/0112438 A1* | 4/2021 | Soloway | H04L 41/5025 |
| 2023/0162394 A1* | 5/2023 | MacWilliams | G06V 20/20 |
| | | | 345/619 |
| 2023/0171376 A1* | 6/2023 | Jeong | H04N 21/440281 |
| | | | 386/224 |
| 2023/0244434 A1* | 8/2023 | Weiss | G06F 40/169 |
| | | | 715/753 |
| 2023/0290046 A1* | 9/2023 | Dahlquist | G06T 7/70 |

* cited by examiner

FILE VIEWING METHOD AND FILE VIEWING SYSTEM

CROSS-REFERENCE TO RELATED APPLICATION

This application claims the priority benefit of Taiwan Application Serial No. 112137188, filed on Sep. 27, 2023. The entirety of the above-mentioned patent application is hereby incorporated by reference herein and made a part of the specification.

BACKGROUND OF THE INVENTION

Field of the Invention

The disclosure relates to a file viewing method and a file viewing system.

Description of the Related Art

Team collaboration is an inevitable part in work. To improve efficiency of team collaboration, many collaboration tools or collaboration platforms have appeared on the market.

However, traditional collaboration tools or collaboration platforms cannot preview a 3D file, which makes a user spend extra time costs when searching for files.

In addition, because a team often has collaborators with different functional backgrounds (for example, an engineer, a project manager, a customer, and the like), communication methods provided by traditional collaboration tools are not intuitive enough, and communication difficulties are prone to occur, affecting work efficiency.

BRIEF SUMMARY OF THE INVENTION

Provided is a file viewing method applicable to a file viewing system. The file viewing system includes a first client electronic device and a second client electronic device. The first client electronic device includes a user interface, and the second client electronic device includes a target object and an application program adapted to view the target object. The file viewing method includes: receiving, by the second client electronic device, an instruction generated by the first client electronic device after determining that the second client electronic device has established a connection to the first client electronic device; executing, by the second client electronic device according to the instruction, the application program to open the target object, to further generate an operable model; and transmitting, by the second client electronic device, a model image corresponding to the operable model to the first client electronic device at an adjustable frame rate, and displaying the model image on the user interface.

The disclosure provides a file viewing system. The file viewing system includes a first client electronic device and a second client electronic device. The first client electronic device includes a user interface. The second client electronic device includes a target object and an application program adapted to view the target object. The second client electronic device is configured to: receive an instruction generated by the first client electronic device after determining that the second client electronic device has established a connection to the first client electronic device; execute, according to the instruction, the application program to open the target object, to further generate an operable model; and transmit a model image corresponding to the operable model to the first client electronic device at an adjustable frame rate and display the model image on the user interface.

According to the file viewing method and the file viewing system provided in the disclosure, the second client electronic device generates an operable model of the target object based on the instruction generated by the first client electronic device, transmits a model image of the operable model to the first client electronic device, and displays the model image on the user interface of the first client electronic device. In this way, even if the first client electronic device does not include a target object and an application program that views the target object, a user also views the target object through the first client electronic device. In addition, the second client electronic device adjusts a frame rate for transmitting the model image, which helps ensure that a picture of the target object is successfully transmitted to the user interface of the first client electronic device for display, and prevent a display effect of the model image from being affected by an interference factor such as performance of the first client electronic device or a network connection between the first client electronic device and the second client electronic device.

DETAILED DESCRIPTION OF THE EMBODIMENTS

More detailed descriptions of the specific embodiments of the disclosure are provided below with reference to the accompanying drawings. The features and advantages of the disclosure are described more clearly according to the following description and claims. It should be noted that all of the drawings use very simplified forms and imprecise proportions, only being used for assisting in conveniently and clearly explaining the objective of the embodiments of the disclosure.

Figure 1:
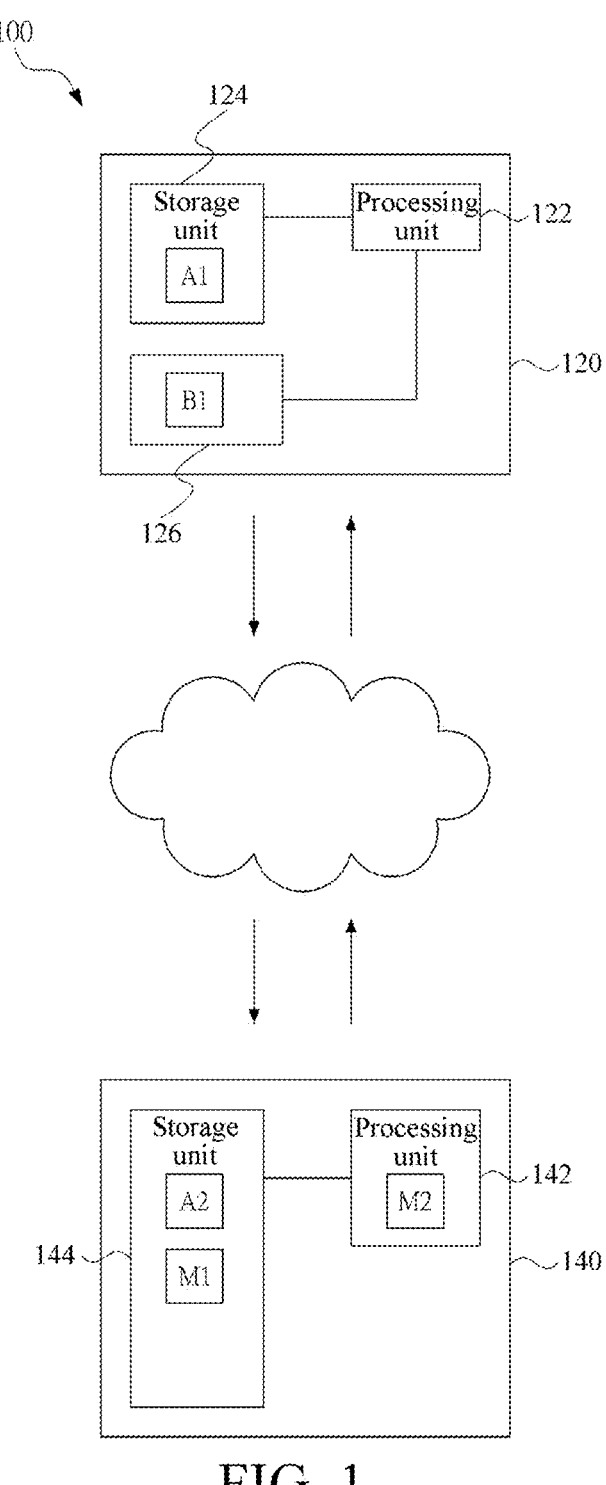
FIG. 1 is a schematic block diagram of performing a file preview operation by a file viewing system according to an embodiment of the disclosure.

FIG. 1 is a schematic block diagram of a file viewing system 100 according to an embodiment of the disclosure.

The file viewing system 100 includes a first client electronic device 120 and a second client electronic device 140. The first client electronic device 120 and the second client electronic device 140 are connected to each other through a network. In an embodiment, the first client electronic device 120 is a portable electronic device, and the second client electronic device 140 is a desktop computer.

The first client electronic device 120 includes a processing unit 122, a storage unit 124, and a display unit 126. The storage unit 124 prestores an application program A1. A processing unit 122 is configured to execute the application program A1. After the application program A1 is executed, a user interface B1 is generated and displayed on the display unit 126 for a user to view and perform an operation. In an embodiment, the processing unit 122 is a central processing unit (CPU), the storage unit 124 is a common store device in an electronic device such as a memory, a hard disk, or a solid state hard disk, and the display unit 126 is a touch screen.

The second client electronic device 140 is connected to the first client electronic device 120 through the network. The second client electronic device 140 includes a processing unit 142 and a storage unit 144. The storage unit 144 stores a target object M1 and an application program A2 adapted to view the target object M1. The processing unit 142 executes the application program A2 to view the target object M1. In an embodiment, the target object M1 is a 3D image file, and the application program A2 is viewing software merely configured to view the 3D image file or 3D image file editing software having an editing function.

In an embodiment, the application program A1 of the first client electronic device 120 has a remote connection function, is connected to the second client electronic device 140, and controls the second client electronic device 140 to start the application program A2. However, the disclosure is not limited thereto. In other embodiments, the first client electronic device 120 also remotely controls the second client electronic device 140 through the network, to execute the application program A2. In another embodiment, the application programs A1 and A2 installed on the first client electronic device 120 and the second client electronic device 140 are same application programs.

In addition, the user interface B1 in this embodiment is directly generated by the application program A1 executed by the first client electronic device 120. However, the disclosure is not limited thereto. In other embodiments, the user interface B1 is alternatively generated by the second client electronic device 140. To be specific, the second client electronic device 140 generates the user interface B1 after executing the application program A2, and the user interface B1 is transmitted to the first client electronic device 120 through a browser or in another network transmission manner and is displayed on the display unit 126 of the first client electronic device 120.

Figure 2:
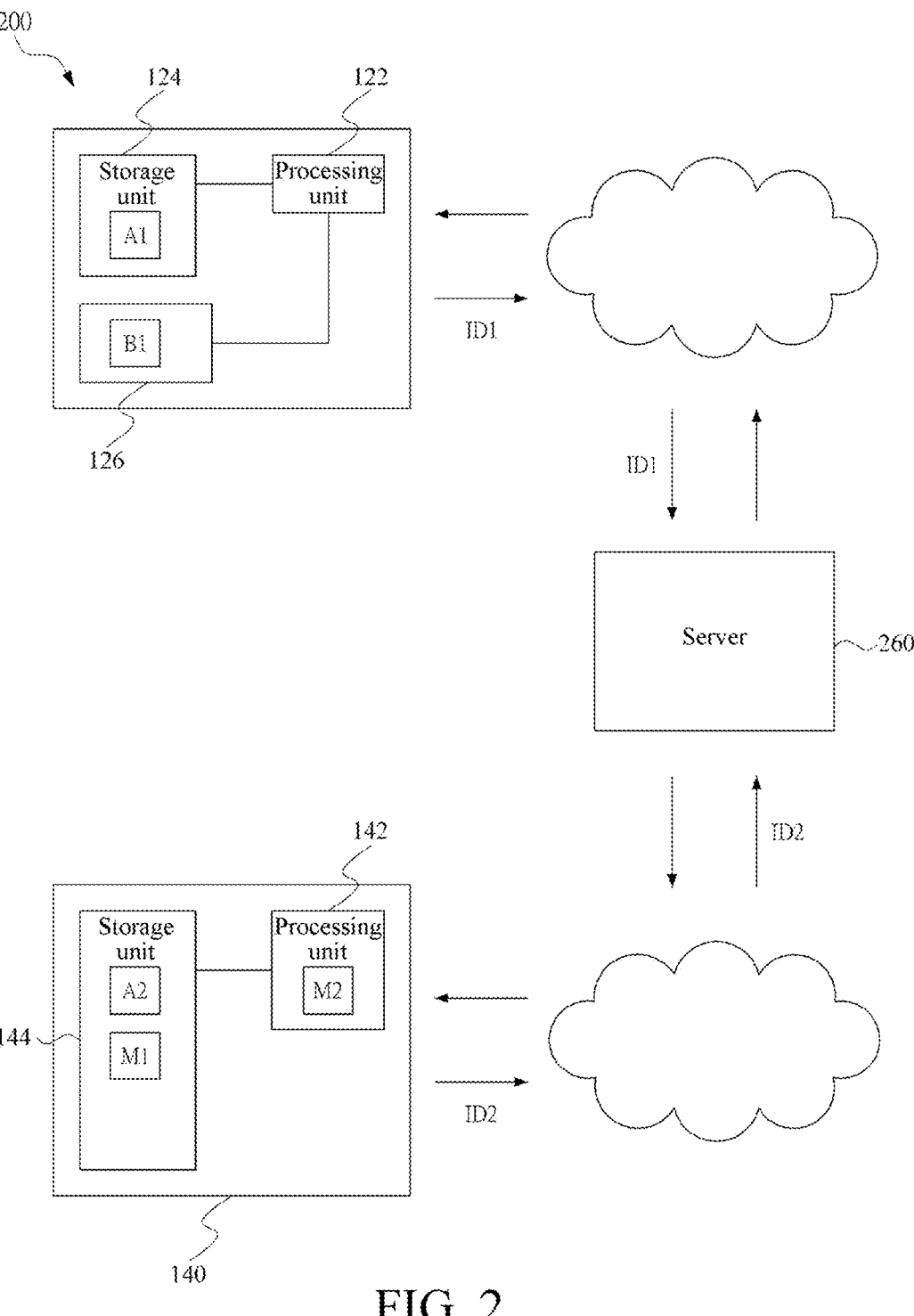
FIG. 2 is a schematic block diagram of performing a file preview operation by a file viewing system according to another embodiment of the disclosure.

FIG. 2 is a schematic block diagram of a file viewing system 200 according to another embodiment of the disclosure.

Compared with the file viewing system 100 in FIG. 1, the file viewing system 200 in this embodiment further includes a server 260 in addition to the first client electronic device 120 and the second client electronic device 140. The first client electronic device 120 and the second client electronic device 140 are connected to the server 260 through a network.

The server 260 receives first client information ID1 from the first client electronic device 120, receives second client information ID2 from the second client electronic device 140, and determines permission of the first client electronic device 120 and the second client electronic device 140 according to the first client information ID1 and the second client information ID2.

For example, if the server 260 determines, by using the first client information ID1 and the second client information ID2, that the first client electronic device 120 obtains complete permission on the second client electronic device 140, the server 260 immediately opens complete permission of the first client electronic device 120 to control the application program A2 of the second client electronic device 140 and a folder of a target file M1. On the contrary, if the server 260 finds, by using the first client information ID1 and the second client information ID2, that the first client electronic device 120 does not obtain any permission on the second client electronic device 140, the server 260 interrupts the connection between the first client electronic device 120 and the second client electronic device 140.

Figure 3:
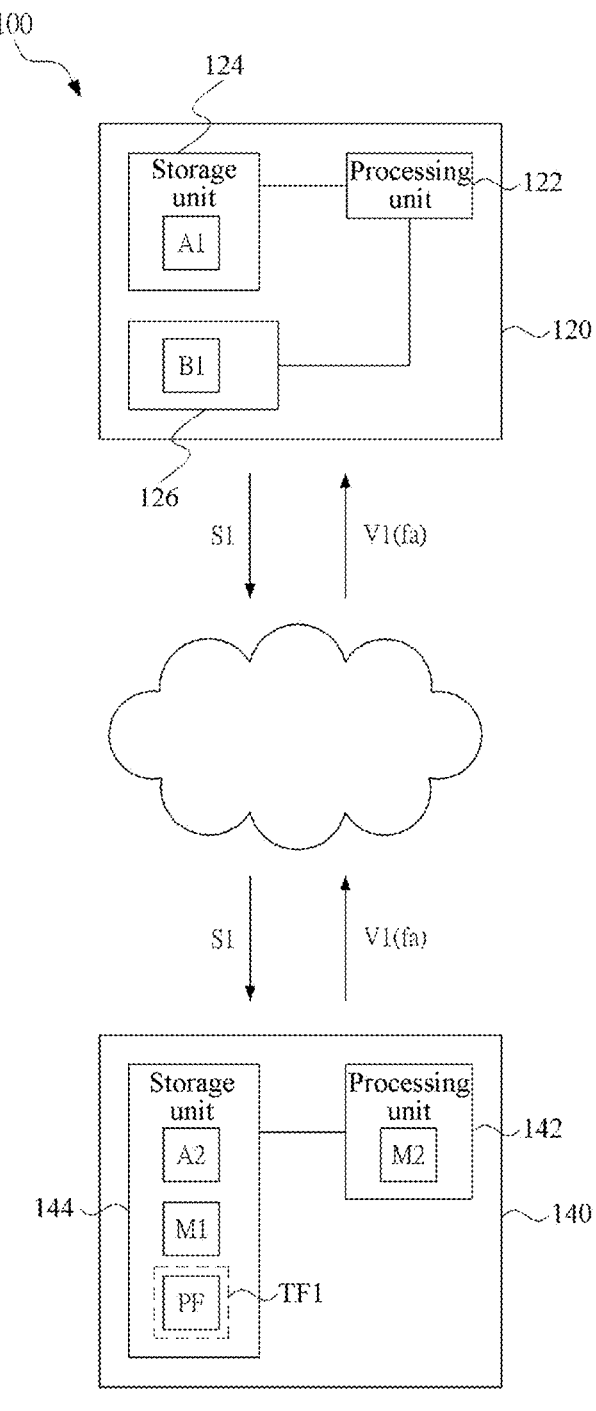
FIG. 3 is a flowchart of a file viewing method according to an embodiment of the disclosure.

FIG. 3 is a schematic block diagram of performing a file viewing operation by the file viewing system 100 in FIG. 1.

As shown in the figure, after the second client electronic device 140 establishes, based on a request of the first client electronic device 120, a connection to the first client electronic device 120 through the network, the second client electronic device 140 receives an instruction S1 generated by the first client electronic device 120. The instruction S1 is a viewing instruction corresponding to the target object M1.

After receiving the instruction S1, the second client electronic device 140 executes the application program A2 according to the instruction S1 to open the target object M1, to further generate an operable model M2. The operable model M2 referred herein means that the model is controlled by the user through the application program A2, to adjust viewing-related parameters such as a perspective, a size, and the like. The operable model M2 is an operable 3D image file.

After generating the operable model M2, the second client electronic device 140 transmits a model image V1 of the operable model M2 to the first client electronic device 120 at an adjustable frame rate fa and displays the model image V1 on the user interface B1 of the first client electronic device 120. In an embodiment, the second client electronic device 140 transmits the model image V1 to the first client electronic device 120 in an image streaming manner for display on the user interface B1. The adjustable frame rate fa referred herein means that a frame rate for the second client electronic device 140 to transmit the model image V1 is not fixed, but is dynamically adjusted according to an actual situation.

In an embodiment, the second client electronic device 140 adjusts the adjustable frame rate fa according to performance of the first client electronic device 120, an execution situation of the application program A1 of the first client electronic device 120, a network transmission speed, or importance of the model image V1. For example, if the performance of the first client electronic device 120 is insufficient, the application program A1 is not executed smoothly, or a network bandwidth is insufficient, the second client electronic device 140 reduces the frame rate for transmitting the model image V1, to avoid freezing occurring on the first client electronic device 120 during operation by the user due to a problem of computer performance, thereby improving user experience. Remote performance detection and network transmission speed detection technologies are not the focus of the disclosure and are well known in the related art, which are not described herein again.

In addition, in the foregoing embodiments, the second client electronic device 140 sets the adjustable frame rate fa according to the performance of the first client electronic device 120. However, the disclosure is not limited thereto. In other embodiments, the second client electronic device 140 also sets the adjustable frame rate fa according to performance of the second client electronic device.

Figure 4:
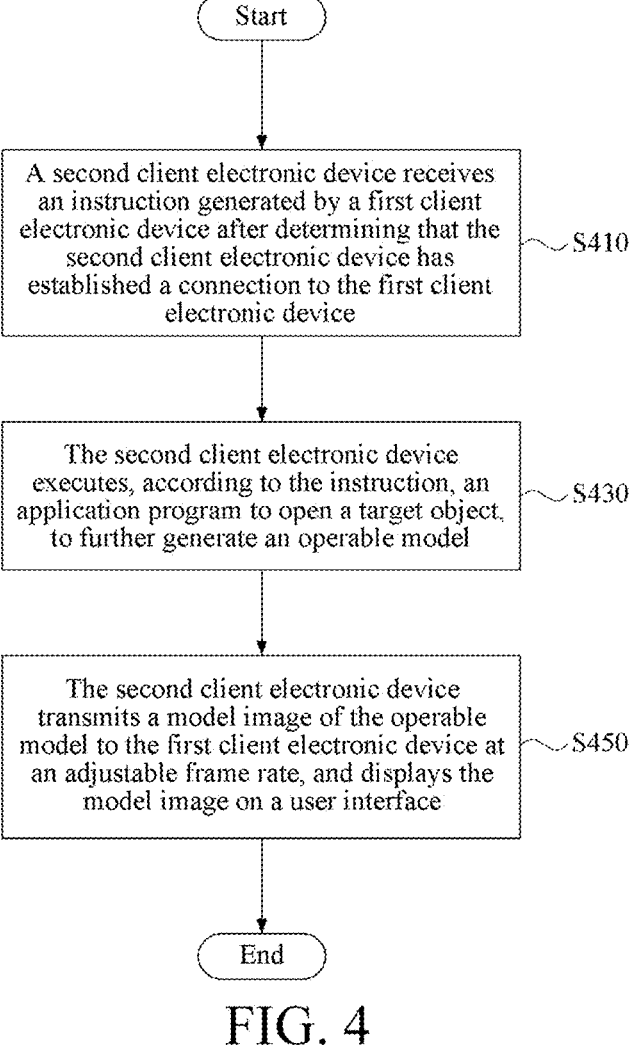
FIG. 4 is a schematic block diagram of performing a file viewing operation by the file viewing system in FIG. 1.

FIG. 4 is a flowchart of a file viewing method according to an embodiment of the disclosure. The file viewing method is applicable to the file viewing system 100 shown in FIG. 1 and FIG. 3. The file viewing system includes a first client electronic device 120 and a second client electronic device 140. The first client electronic device 120 includes a user interface B1, and the second client electronic device 140 includes a target object M1 and an application program A2 adapted to view the target object M1. The file viewing method includes the following steps:

First, as described in step S410, the second client electronic device 140 receives an instruction S1 generated by the first client electronic device 120 after determining that the second client electronic device 140 has established a connection to the first client electronic device 120. The instruction S1 is a viewing instruction corresponding to the target object M1.

Then, as described in step S430, the second client electronic device 140 executes the application program A2 according to the instruction S1 to open the target object M1, to further generate an operable model M2. In an embodiment, the operable model M2 is an operable 3D image file.

Next, as described in step S450, the second client electronic device 140 transmits a model image V1 of the operable model M2 to the first client electronic device 120 at an adjustable frame rate fa and displays the model image V1 on the user interface B1.

For example, the second client electronic device 140 adjusts the adjustable frame rate fa according to performance of the first client electronic device 120, a network transmission speed, or importance of the model image V1, and transmits the model image V1 to the first client electronic device 120 at an adjustable frame rate fa after adjustment and displays the model image V1 on the user interface B1, to ensure that the model image V1 of the target object M1 is smoothly displayed on the user interface B1 of the first client electronic device 120, thereby providing the user with better user experience.

Figure 5:
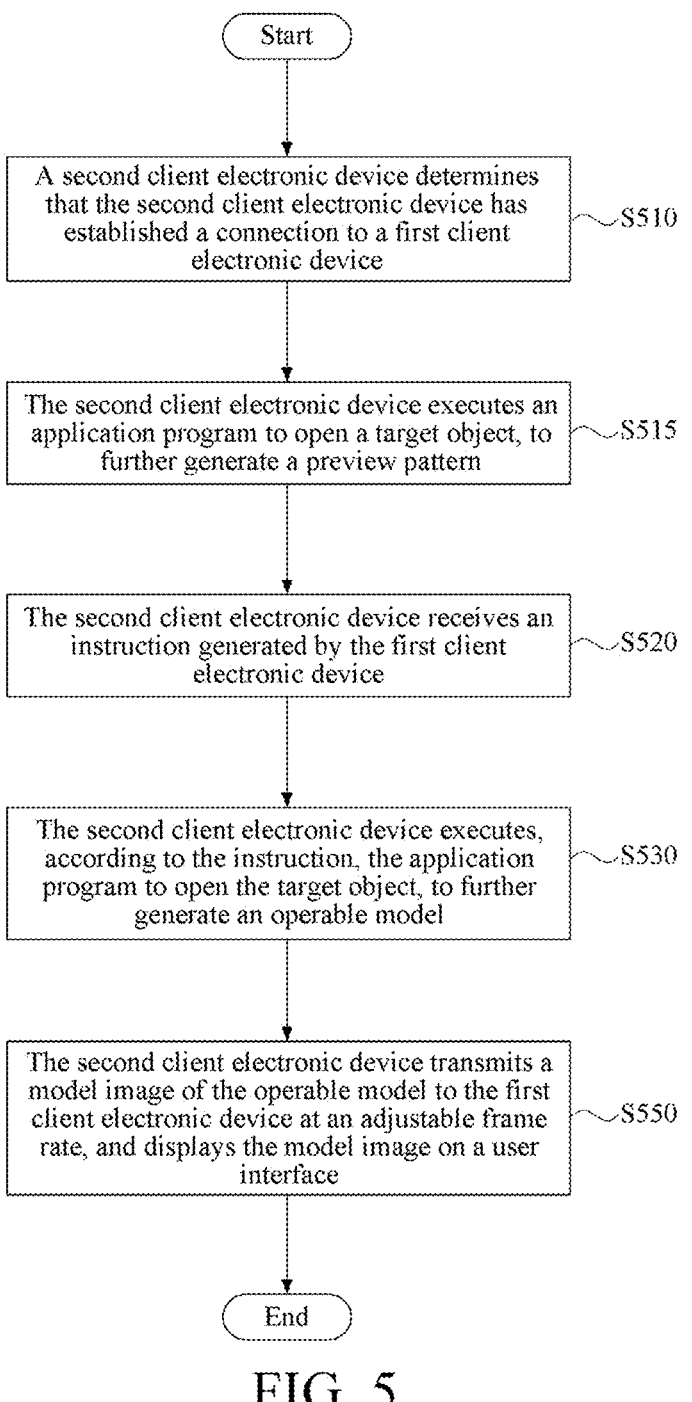
FIG. 5 is a schematic block diagram of performing a file annotation operation by the file viewing system in FIG. 1.

FIG. 5 is a flowchart of a file viewing method according to another embodiment of the disclosure. The file viewing method is applicable to the file viewing system 100 shown in FIG. 1 and FIG. 3. The file viewing system includes a first client electronic device 120 and a second client electronic device 140. The first client electronic device 120 includes a user interface B1, and the second client electronic device 140 includes a target object M1 and an application program A2 adapted to view the target object M1. This embodiment relates to a file preview technology. The file viewing method includes the following steps:

First, as described in step S510, the second client electronic device 140 determines that the second client electronic device has established a connection to the first client electronic device 120.

Then, as described in step S515, the second client electronic device 140 executes the application program A2 to open the target object M1, to further generate a preview pattern PF. In an embodiment, after detecting that the first client electronic device 120 executes the application program A1 and opens the user interface B1, the second client electronic device 140 executes the application program A2 to open the target object M1, to further generate the preview pattern PF. In this way, when remotely viewing a folder of the second client electronic device 140 through the user interface B1 of the first client electronic device 120, the user pre-determines content of the target object M1 by using the preview pattern PF without actually clicking. In an embodiment, the preview pattern PF is a compressed image file, to reduce a volume of data to be transmitted. The preview pattern PF is stored in a transitory file TF1, to avoid waste of too large space. The transitory file TF1 is saved in local storage space or a cache directory.

Then, as described in step S520, the second client electronic device 140 receives an instruction S1 generated by the first client electronic device 120. The instruction S1 is a viewing instruction corresponding to the target object M1. Step S510 corresponds to a part of step S410 in FIG. 4.

Then, as described in step S530, the second client electronic device 140 runs the application program A2 according to the instruction S1 to open the target object M1, to further generate an operable model M2. Next, as described in step S550, the second client electronic device 140 transmits a model image V1 of the operable model M2 to the first client electronic device 120 at an adjustable frame rate fa and displays the model image V1 on the user interface B1. Steps S530 and S550 are the same as steps S430 and S450 in FIG. 4, and details are not described herein again.

Figure 6:
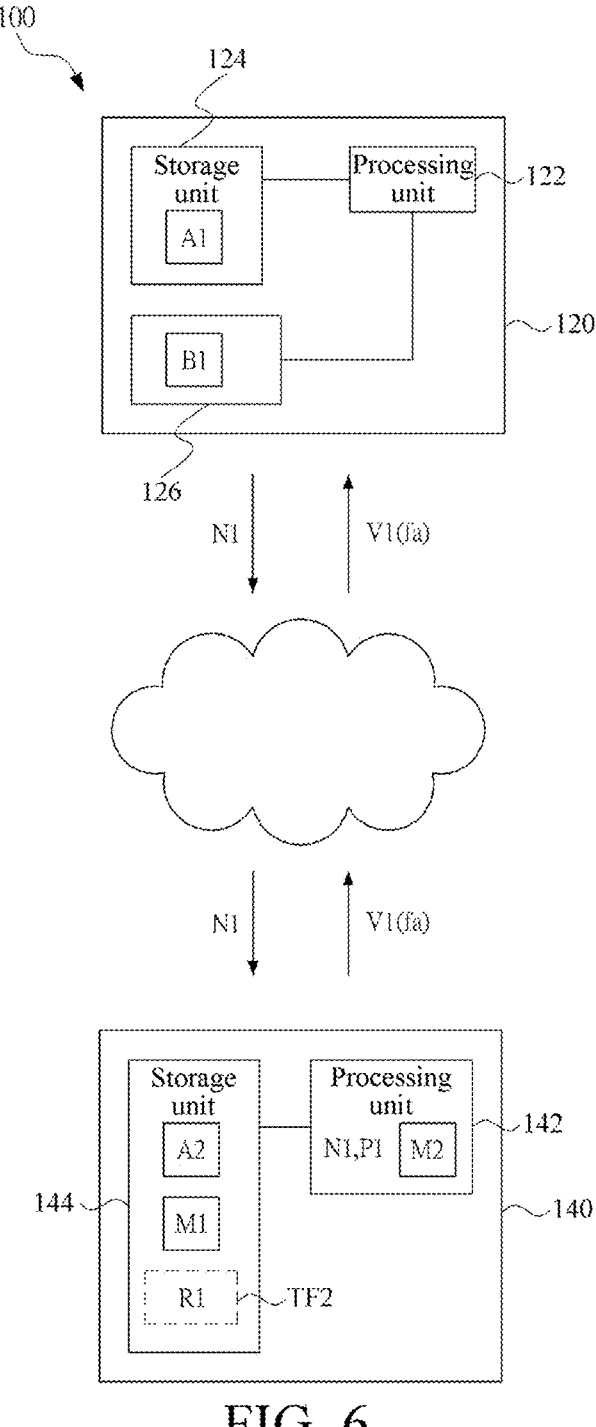
FIG. 6 is a flowchart of a file viewing method according to an embodiment of the disclosure.

FIG. 6 is a schematic block diagram of performing a file annotation operation by the file viewing system 100 in FIG. 1.

As shown in the figure, after the second client electronic device 140 determines that the second client electronic device 140 has established a connection to the first client electronic device 120 and executes the application program A2 to open the target object M1, the user inputs a text annotation N1 through the user interface B1 of the first client electronic device 120.

The second client electronic device 140 receives the text annotation N1 generated by the first client electronic device 120, and records, according to the text annotation N1, viewing information P1 corresponding to the operable model M2 in real time.

Then, the second client electronic device 140 stores the viewing information P1 and the text annotation N1 as an intermediate execution result R1 in a transitory file TF2 for recording.

In an embodiment, to accelerate a viewing operation by the first client electronic device 120, the second client electronic device 140 synchronously stores an intermediate execution result R1 in the first client electronic device 120, so that the first client electronic device 120 generates a label (not shown in the figure) according to the intermediate execution result R1 and displays the label on the user interface B1. The label displayed by the first client electronic device 120 is described in detail in paragraphs corresponding to FIG. 9 and FIG. 10.

In an embodiment, to save storage space, when the second client electronic device 140 immediately deletes the transitory file TF2 when detecting that the first client electronic device 120 closes the user interface B1 or the connection between the first client electronic device 120 and the second client electronic device 140 is interrupted.

In an embodiment, if the target object M1 is a 3D image file, the viewing information P1 includes orientation information and zoom information. In an embodiment, if the target object M1 is a film file, the viewing information P1 includes a film time point.

Figure 7:
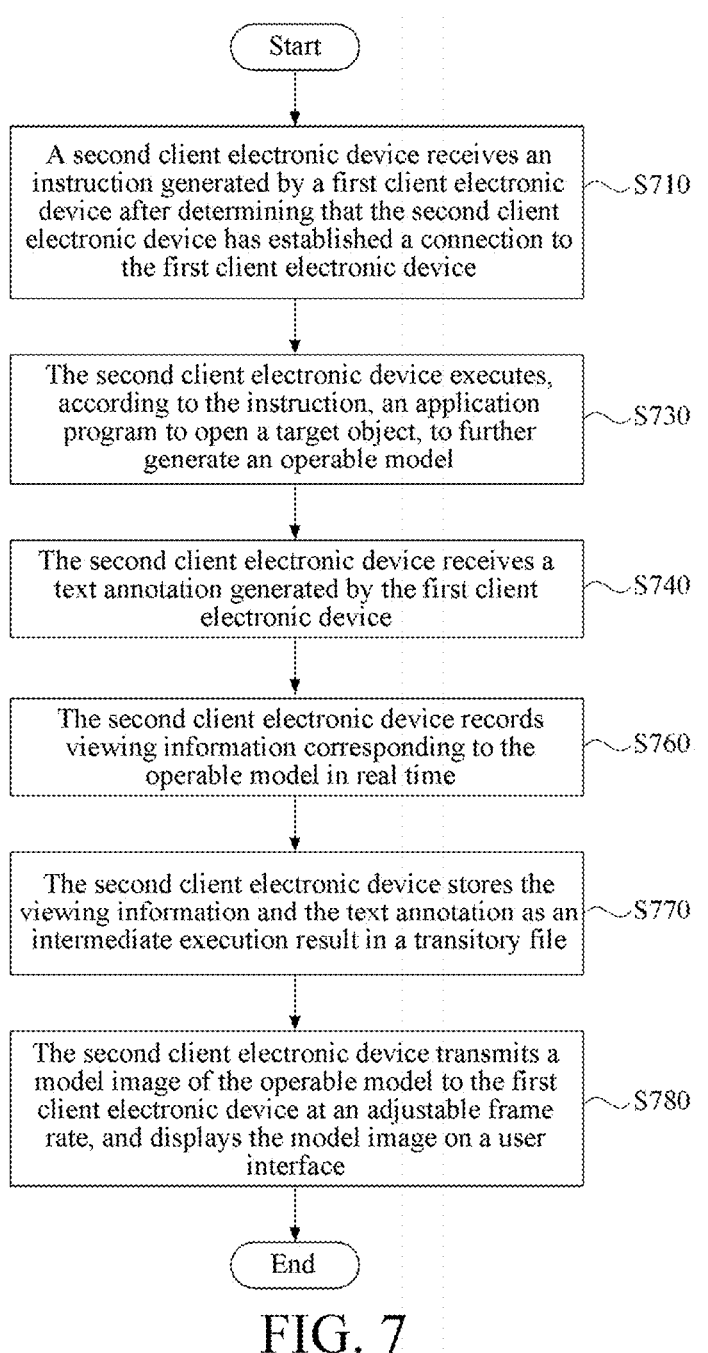
FIG. 7 is an embodiment of step S630 in FIG. 6.

FIG. 7 is a flowchart of a file annotation method according to an embodiment of the disclosure. The file annotation method is applicable to the file viewing system 100 shown in FIG. 1. The file viewing system includes a first client electronic device 120 and a second client electronic device 140. The first client electronic device 120 includes a user interface B1, and the second client electronic device 140 includes a target object M1 and an application program A2 adapted to view the target object M1. The file annotation method includes the following steps:

First, as described in step S710, the second client electronic device 140 receives an instruction S1 generated by the first client electronic device 120 after determining that the second client electronic device 140 has established a connection to the first client electronic device 120.

Then, as described in step S730, the second client electronic device 140 executes the application program A2 according to the instruction S1 to open the target object M1, to further generate an operable model M2. Steps S710 and S730 are the same as steps S410 and S430 in the file viewing method in FIG. 4.

Then, as described in step S740, the second client electronic device 140 receives a text annotation N1 generated by the first client electronic device 120.

Next, as described in step S760, the second client electronic device 140 records viewing information P1 corresponding to the operable model M2 in real time.

Then, as described in step S770, the second client electronic device 140 stores the viewing information P1 and the text annotation N1 as an intermediate execution result R1 in a transitory file TF2. The transitory file TF2 is saved in local storage space or a cache directory.

Next, as described in step S780, the second client electronic device 140 transmits a model image V1 of the operable model M2 to the first client electronic device 120 at an adjustable frame rate fa and displays the model image V1 on the user interface B1. Step S780 is similar to step S450 in the file viewing method in FIG. 4.

Figure 8:
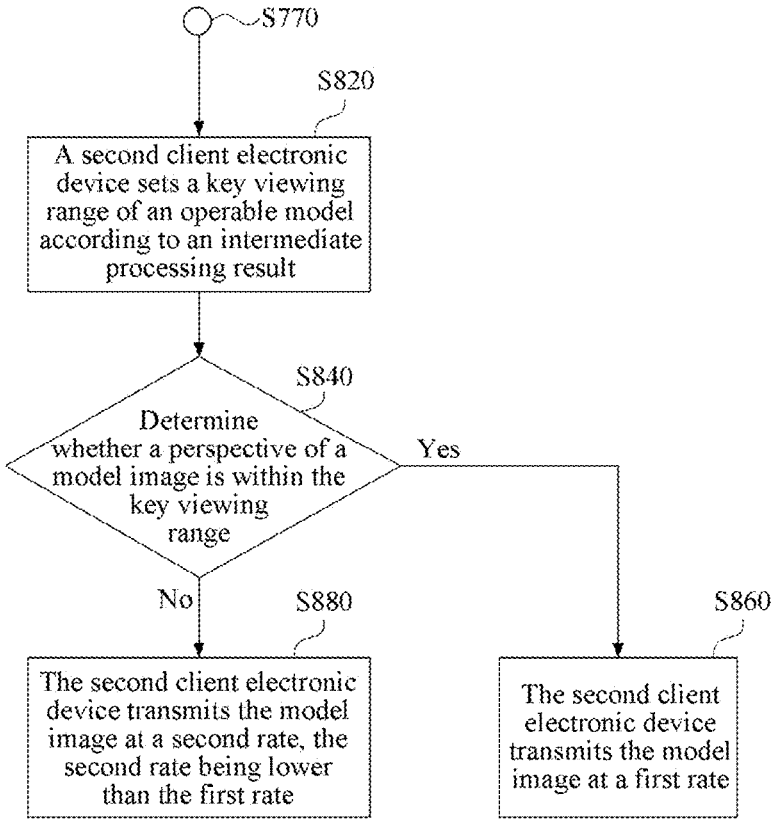
FIG. 8 is a flowchart of a file viewing method according to another embodiment of the disclosure.

FIG. 8 is an embodiment of step S780 in FIG. 7.

Following step S770, after the second client electronic device 140 stores the intermediate execution result R1 stores in the transitory file TF2, as described in step S820, the second client electronic device 140 sets a key viewing range of the operable model M2 according to an intermediate execution result R1.

Then, as described in a determining step S840, whether a perspective corresponding to the model image V1 is within the key viewing range is determined. If the perspective corresponding to the model image V1 is within the key viewing range, as described in step S860, the second client electronic device 140 transmits the model image V1 at a first rate. If the perspective corresponding to the model image V1 is not within the key viewing range, as described in step S880, the second client electronic device 140 transmits the model image V1 at a second rate, the second rate being lower than the first rate.

In an embodiment, the second client electronic device 140 sets model image V1 corresponding to viewing information P1 of the intermediate execution result R1 as a key picture, and sets the key viewing range by using the key picture. In other words, the key viewing range is a range defined by the viewing information P1 (refer to step S760) recorded by the second client electronic device 140. For example, when the target object M1 is a 3D image file, the key viewing range is within a preset angle range of a perspective corresponding to orientation information of the viewing information P1. When the target object M1 is a film file, the key viewing range is within a preset time range before and after a film time point corresponding to the viewing information P1.

Figure 9:
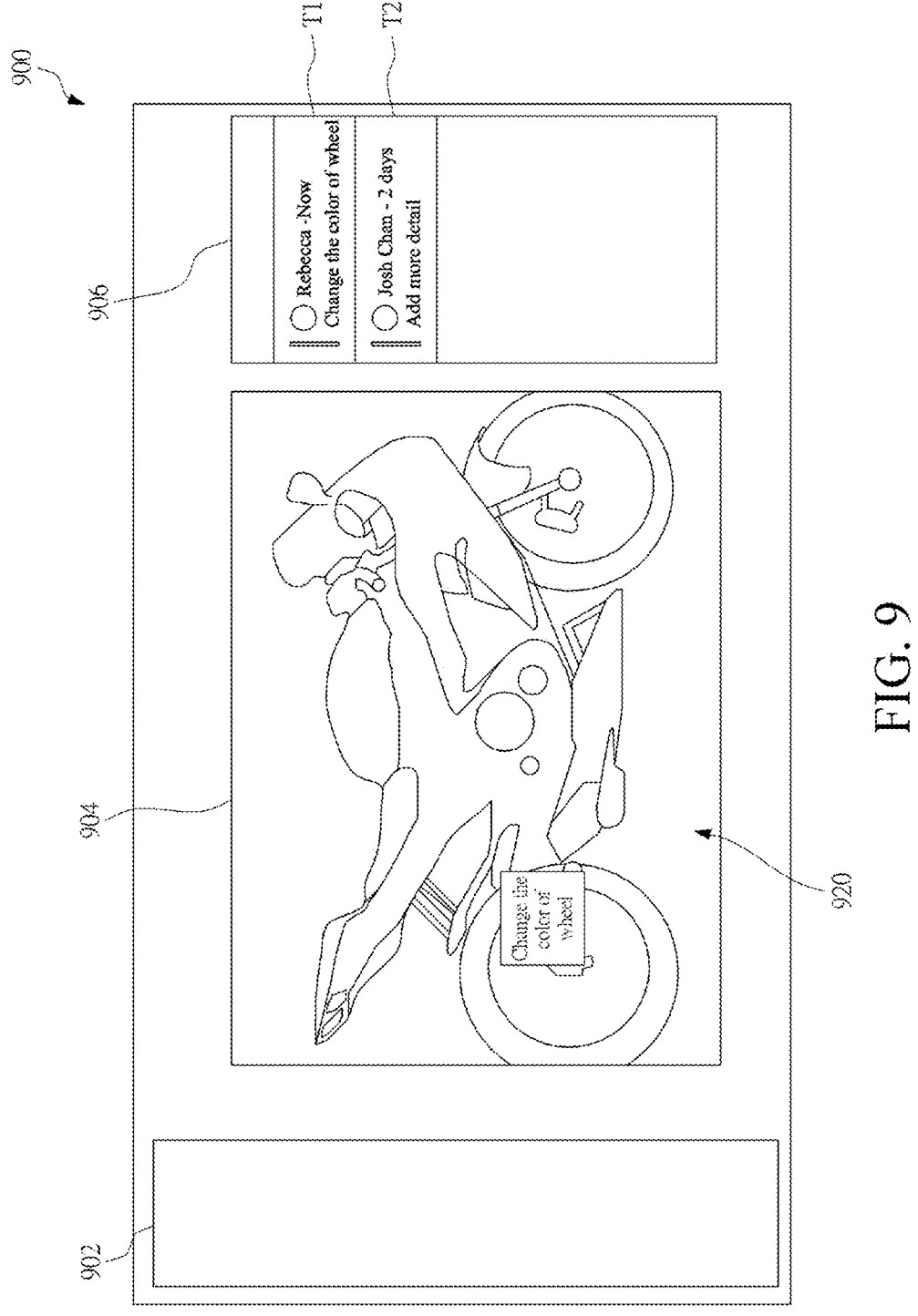
FIG. 9 and FIG. 10 are flowcharts of a file viewing method according to an embodiment of the disclosure.
Figure 10:
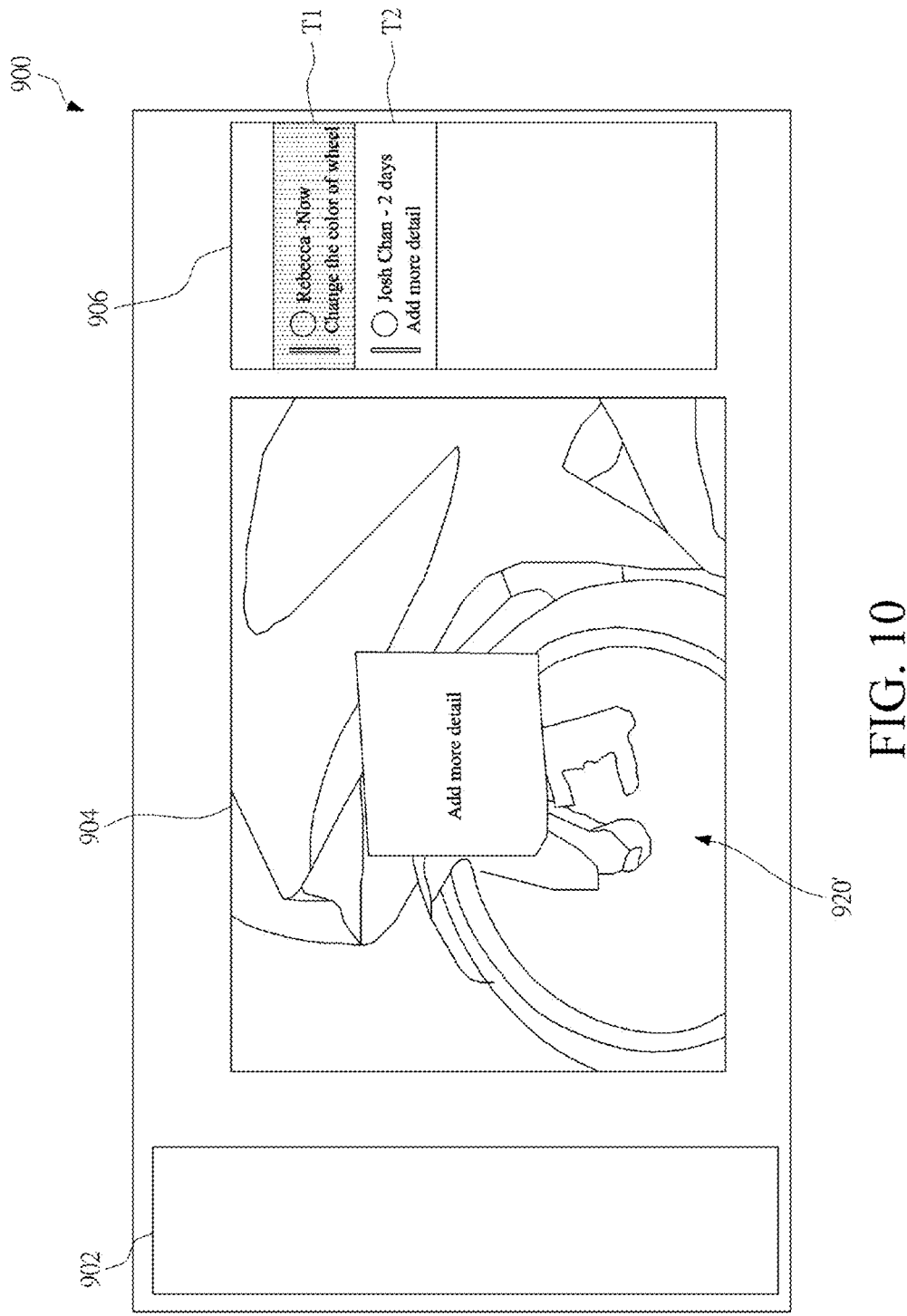

FIG. 9 and FIG. 10 are schematic diagrams of a user interface 900 according to an embodiment of the disclosure. The user interface 900 in the figure displays labels T1 and T2 corresponding to a model image 920 of an operable model. The operable model in the figure is a motorcycle.

As shown in FIG. 9, the user interface 900 is substantially divided into a left column 902, a middle column 904, and a right column 906. The left column 902 is configured to display a function option (not shown in the figure). The middle column 904 is configured to display the model image 920 of the operable model. The right column 906 is configured to display both the labels T1 and T2 associated with the target object.

The user inputs a control instruction through the user interface 900 to rotate, drag, and zoom the operable model displayed in the middle column 904. To be specific, referring to the file viewing system 100 shown in FIG. 1 together, the control instruction inputted by the user through the user interface is transmitted from the first client electronic device 120 to the second client electronic device 140, after receiving the control instruction, the second client electronic device 140 perform an operation such as rotating, dragging, and zooming the operable model M2 according to the control instruction to generate a corresponding model image V1 and transmit the model image V1 to the user interface of the first client electronic device 120 for viewing by the user.

In addition, as shown in the figure, the user directly adds a text annotation at a proper position on the model image 920 displayed by the user interface 900, for example, text of "Change the color of wheel" in the figure. The text annotation is recorded in the right column 906 in a form of the label T1. In addition to the text annotation inputted by the user, content recorded by the labels T1 and T2 further includes a name and an annotation time of a marker.

After the labels T1 and T2 are inputted, if the user clicks a specific label (for example, a label T1 shown in the figure) in the right column 906, as shown in FIG. 10, the clicked label T1 generates a color change to prompt the user, and a model image 920' of the operable model displayed in the middle column 904 of the user interface 900 is automatically adjusted to a viewing position corresponding to the label T1, for example, an orientation corresponding to the operable model when the user inputs the text annotation, which is beneficial to team collaboration and communication.

According to the file viewing method and the file viewing system 100 provided in the disclosure, the second client electronic device 140 generates an operable model M2 of the target object M1 based on the instruction S1 generated by the first client electronic device 120, transmits a model image V1 of the operable model M2 to the first client electronic device 120, and displays the model image V1 on the user interface B1 of the first client electronic device 120. In this way, even if the first client electronic device 120 does not include a target object M1 and an application program A2 that views the target object M1, the user also views the target object M1 through the first client electronic device 120. In addition, the second client electronic device 140 adjusts an adjustable frame rate fa for transmitting the model image V1, which helps ensure that a picture of the target object M1 is successfully transmitted to the user interface B1 of the first client electronic device 120 for display, and prevent a display effect of the model image V1 from being affected by an interference factor such as performance of the first client electronic device 120 or a network connection between the first client electronic device 120 and the second client electronic device 140.

The above is merely exemplary embodiments of the disclosure, and does not constitute any limitation on the disclosure. Any form of equivalent replacements or modifications to the technical means and technical content disclosed in the disclosure made by a person skilled in the art without departing from the scope of the technical means of the disclosure shall still fall within the content of the technical means of the disclosure and the protection scope of the disclosure.

What is claimed is:

1. A file viewing method, applicable to a file viewing system comprising a first client electronic device and a second client electronic device, the first client electronic device comprising a user interface, and the second client electronic device comprising a target object and an application program adapted to view the target object, and the file viewing method comprising:

receiving, by the second client electronic device, an instruction generated by the first client electronic device after determining that the second client electronic device has established a connection to the first client electronic device;

executing, by the second client electronic device according to the instruction, the application program to open the target object, to further generate an operable model;

transmitting, by the second client electronic device, a model image corresponding to the operable model to the first client electronic device at an adjustable frame rate, and displaying the model image on the user interface;

receiving, by the second client electronic device, a text annotation generated by the first client electronic device;

recording, by the second client electronic device in real time, viewing information corresponding to the operable model when the text annotation is generated;

and storing, by the second client electronic device, the viewing information and the text annotation as an intermediate execution result in a transitory file, wherein the viewing information comprises orientation information and zoom information of the operable model, wherein the second client electronic device sets the adjustable frame rate according to performance of the first client electronic device and the second client electronic device, and wherein the step of transmitting, by the second client electronic device, the model image corresponding to the operable model to the first client electronic device at the adjustable frame rate, and displaying the model image on the user interface comprises:

setting, by the second client electronic device, a key viewing range of the operable model according to the intermediate execution result transmitting the model image at a first frame rate when a perspective corresponding to the model image is within the key viewing range and transmitting the model image at a second frame rate when the perspective corresponding to the model image is not within the key viewing range, the second frame rate being lower than the first frame rate.

2. The file viewing method according to claim 1, wherein the target object is a 3D image file.

3. The file viewing method according to claim 1, wherein the target object is a film file, and the viewing information comprises a film time point.

4. The file viewing method according to claim 1 wherein the second client electronic device synchronously stores the intermediate execution result in the first client electronic device.

5. The file viewing method according to claim 1, wherein the first client electronic device generates a label according to the intermediate execution result and displays the label on the user interface.

6. The file viewing method according to claim 1 further comprising: deleting, by the second client electronic device, the transitory file when detecting that the connection between the first client electronic device and the second client electronic device is interrupted.

7. The file viewing method according to claim 1, wherein the second client electronic device sets the model image corresponding to the viewing information of the intermediate execution result as a key picture, and sets the key viewing range by using the key picture.

8. The file viewing method according to claim 1, wherein after the second client electronic device determines that the second client electronic device has established the connection to the first client electronic device, the second client electronic device executes the application program to open the target object, to further generate a preview pattern.

9. A file viewing system, comprising:

a first client electronic device, comprising a user interface; and a second client electronic device, comprising a target object and an application program adapted to view the target object, wherein the second client electronic device is configured to:

receive an instruction generated by the first client electronic device after determining that the second client electronic device has established a connection to the first client electronic device;

execute, according to the instruction, the application program to open the target object, to further generate an operable model;

transmit a model image corresponding to the operable model to the first client electronic device at an adjustable frame rate and display the model image on the user interface;

receive a text annotation generated by the first client electronic device; record in real time viewing information corresponding to the operable model when the text annotation is generated, and store the viewing information and the text annotation as an intermediate execution result in a transitory file, wherein the viewing information comprises orientation information and zoom information of the operable model, wherein the second client electronic device sets the adjustable frame rate according to performance of the first client electronic device and the second client electronic device, and wherein the step of transmitting, by the second client electronic device, the model image corresponding to the operable model to the first client electronic device at the adjustable frame rate, and displaying the model image on the user interface comprises:

setting, by the second client electronic device, a key viewing range of the operable model according to the intermediate execution result transmitting the model image at a first frame rate when a perspective corresponding to the model image is within the key viewing range, and transmitting the model image at a second frame rate when the perspective corresponding to the model image is not within the key viewing range, the second frame rate being lower than the first frame rate.

10. The file viewing system according to claim 9, further comprising a server, wherein the server receives first client information from the first client electronic device, receives second client information from the second client electronic device, and determines, according to the first client information and the second client information, permission of the first client electronic device to control the second client electronic device.

* * * * *